Patented July 15, 1952

2,603,571

UNITED STATES PATENT OFFICE 2,603,571

MASTIC FLOOR COVERING AND A PROCESS OF MAKING IT

William Castellano, San Lorenzo, Calif., assignor to Union Oil Company of California, Los Angeles, Calif., a corporation of California No Drawing. Application December 19, 1949, Serial No. 133,966

17 Claims. (Cl. 106—123)

This invention relates to mastic type floor coverings which are particularly suitable for industrial applications, which coverings are especially serviceable on grade concrete installations and are useful in hospitals, schools, barracks, warehouses, manufacturing plants and the like. The invention relates particularly to resin-like materials which may be used in the preparation of such floor coverings, to their methods of preparation and to compositions containing such resins together with hardening agents, fillers, binders, pigments and the like, which compositions may be applied to floors directly or which are preferably coated on backing material to produce floor coverings.

Desirable floor coverings, particularly for industrial application, must be relatively cheap and must be sufficiently hard, non-brittle and abrasion resistant to withstand heavy usage without cracking, chipping or breaking and without undue wear. Moreover, the floor coverings must be resistant to the action of oils, both hydrocarbon and fatty oils, i. e., such oils must not penetrate or swell the covering or cause disintegration of the surface. Furthermore, the floor covering must be resistant to the action of alkalis thus permitting the use of alkaline washing powders, industrial soaps and the like for cleaning purposes.

It is an object of this invention to prepare floor coverings having all of the above enumerated characteristics and it is a further object of this invention to prepare a resin, which is referred to herein as a floor covering vehicle, which has particular utility in the preparation of such floor coverings, which resin or vehicle may be combined with fillers, pigments and the like to produce coating compositions which may be employed as floor covering per se or which may be bonded directly to a backing or supporting material to form a finished floor covering which may then be layed on floors or flooring in a conventional manner, preferably with the use of a cementing material or binder.

It is a further object of this invention to prepare a floor covering vehicle by heating a mixture of tall oil pitch and a particular acidic fraction obtained by the controlled oxidation of paraffin wax with a polyfunctional alcohol.

It is a more specific object of this invention to prepare a finished floor covering consisting of an asphalt-saturated felt base having coated thereon a relatively thin layer of the described floor covering vehicle or preferably a layer of the vehicle which contains filler with or without pigments.

It is still another object of this invention to prepare a floor covering, having all of the above described characteristics, from a mixed polyalcohol ester of tall oil pitch and acids produced by the oxidation of paraffin wax wherein the mixed ester is hardened by the addition of ethyl cellulose.

Other objects and features of the invention will be apparent as the description thereof proceeds.

The above objects are accomplished according to this invention by preparing a mixed ester of tall oil pitch and a water-insoluble acid fraction produced by the oxidation of paraffin wax under conditions described hereinbelow. These mixed esters may be employed as such or they may be heated to effect at least partial polymerization or modified and hardened by adding ethyl cellulose and heating and stirring the resulting mixture to obtain a homogeneous mixture. The resulting mixed esters or modified esters may be coated on backing material without further modification to obtain a desirable floor covering. However, preferably these esters or modified esters are admixed with fillers, particularly mineral fillers such as powdered silicate-type rock and/or mineral pigments such as any of the well known mineral pigments which are stable up to the compounding or processing temperatures, i. e., up to about 400° F. in order to give desirable colors and to improve body and strength, particularly to improve abrasion and wear resistance.

Tall oil pitch is a commercially available product obtained as a residue in the vacuum distillation of tall oil, tall oil being the acidic oily material recovered as a by-product in the paper industry by acidification of the soaps which separate from alkaline black liquor upon evaporation. Tall oil pitch is a solid brown material having a softening point in the range of 90° F. to 100° F. and becoming fluid at higher temperatures. It contains roughly 35% to 50% fatty acids, 24% to 32% of rosin-like acids and 22% to 32% of sterols and higher alcohols. This material generally has an acid number of 60 to 75 mg. KOH/g. and a saponification number of 90 to 110 mg. KOH/g.

The water-insoluble acid fraction produced by the oxidation of paraffin wax used in preparing the compositions of this invention is that fraction of oxidized wax remaining after extracting wax oxidate with water. The oxidized wax, which will be referred to herein as wax oxidate, is obtained by the liquid phase air or oxygen-containing gas oxidation of paraffin wax. The paraffin waxes most suitable as oxidation stocks are those containing between 15 and 50 carbon atoms per molecule or more and preferably those containing between about 20 and about 35 carbon atoms per molecule. The wax is preferably a refined paraffin wax having a melting point about 90° F. and preferably between about 120° F. and about 200° F. It is desirable that the wax be relatively free from oil and thus waxes produced by well known waxing and deoiling processes are particularly desirable. Such dewaxing and deoiling processes are generally described in U. S. Patent No. 2,229,658.

The oxidation is carried out in the liquid phase by blowing the melted wax with a gas containing free oxygen until the acid number of the oxidized material is between 200 and 260 mg. KOH/g. and preferably between about 230 and about 250 mg. KOH/g. The oxidation is preferably carried out at pressures between normal atmospheric pressure and 20 atmospheres pressure. Generally a pressure between 3 and 10 atmospheres will be employed. The temperature of air blowing must be above the melting point of the wax employed and below about 285° F. and desirably the temperature will be in the range of about 210° F. to about 265° F. Air is blown into the liquid wax at a rate between about 1 and 20 standard cubic feet per minute per 42-gallon barrel of the wax. The preferred air rate is between about 10 and 15 standard cubic feet per barrel per minute. During the oxidation the volatized lower molecular weight compounds are not returned to the mass being oxidized.

It is important that the conditions of oxidation be maintained within the limits above described in order that the oxidized product will have the composition desired. Thus, if temperatures above those indicated are employed extensive decarboxylation and/or other degradation reactions occur with the result that a more complex and less readily separable mixture is obtained and the yield of desired acids is reduced. If the oxidation is discontinued when the oxidized mass has an acid number below about 200 mg. KOH/g. the proportion of undesirable acids in the oxidized product and of unreacted wax is objectionably high. Thus, if the oxidation is carried to a point that the acid number is 100 mg. KOH/g. the acids are primarily of the fatty acid type and are not suitable for use in preparing the compositions of this invention. On the other hand if the oxidation is continued until the acid number is over about 260 the proportions of water-soluble acids and of degradation products of the desirable acids is increased and the resulting water-insoluble fraction is not as satisfactory for use in preparing floor covering compositions.

The oxidized wax having an acid number between 200 and 260 mg. KOH/g. is extracted with water to remove water-soluble constituents, which include the lower molecular weight acids and possibly other oxygenated materials. Generally the water washing is conducted at or near the boiling point of water and desirably two or more washes with 2 to 10 volumes of water per volume of oxidized wax per wash is employed. After separation of the aqueous phase following water washing the water washed oxidized wax will have an acid number between about 100 and 175 mg. KOH/g. and generally around 150 mg. KOH/g. This water washed material may be dehydrated and employed directly in the preparation of mixed esters as described hereinbelow or it may be further treated to obtain a fraction rich in acids which are insoluble in low molecular weight hydrocarbons, which fraction may be employed to produce a superior floor covering. Such further treatment to effect the separation of a fraction having a high content of the desired acids consists in extracting the water washed oxidized wax with one or more 2 to 10 volume portions of a non-polar solvent such as a low molecular weight hydrocarbon or mixture of low molecular weight hydrocarbons, as for example, propane, pentane, hexane, heptane, octane or mixtures of these hydrocarbons or a light naphtha or petroleum thinner fraction. The extraction is preferably carried out at a temperature above the melting point of the water washed oxidized wax. In this extraction, unoxidized wax, fatty acids and neutral oxygenated compounds are dissolved in the solvent, leaving as an insoluble fraction those more highly oxygenated hydrocarbon-insoluble components, together with small amounts of contaminating fatty acids and neutral oxygenated compounds. The hydrocarbon-insoluble fraction, which amounts to 25% to 60% by weight of the original water washed oxidized wax, depending upon the acid number of the original oxidized wax, consists of molecules containing 3 or more oxygen atoms per molecule. The composition of the wax oxidate or of the hydrocarbon-insoluble portion of the oxidate is not known and is not essential to the understanding of this invention. It is sufficient that a water washed wax oxidate prepared in the manner described or that a hydrocarbon-insoluble portion of the water washed wax oxidate prepared as indicated be employed in the process of this invention as described hereinbelow.

In preparing the tall oil pitch-wax oxidate mixed esters, a mixture of these two materials containing between about 5% and about 75% by weight of wax oxidate or hydrocarbon-insoluble wax oxidate is heated together with the chemically equivalent amount of a polyhydroxy compound having at least 3 hydroxyl groups per molecule, such as glycerol or pentaerythritol, to a temperature in the range of 300° F. to 600° F. for a time sufficient to reduce the acid number of the mixture to a value less than about 35 and preferably less than about 25 mg. KOH/g. The heating is preferably carried out in the absence of air, particularly if a light colored product is desired although an open kettle may be employed and will usually be employed in the preparation of the darker colored floor coverings. It is necessary that water present in the reaction mixture as well as the water produced as a result of esterification be removed in order to permit the reaction to proceed to the desired low acid number value. Thus, a partially closed vessel having openings to permit the introduction of $CO_2$ into the vapor space above the liquid and permit the escape of $CO_2$ and water vapor from the reaction chamber is a satisfactory reaction vessel. Desirably, the vessel will be provided with means for stirring and it is essential that means for heating be provided. Heating may be effected electrically by means of resistance wires surrounding the lower portion of the vessel or by direct fire, as is typical of paint and varnish kettles. During the progress of the reaction, samples may be removed at intervals to determine the extent of reaction and, depending upon the temperature employed, esterification is sufficiently complete after 4 to 15 or 20 hours. Mixed esters having acid numbers in the range of about 10 to about 30 mg. KOH/g. have been found to produce excellent floor coverings.

In order to harden the mixed esters produced as above they may be heated and mixed with ethyl cellulose until the mass is fluxed, i. e., until a homogeneous fluid is obtained. Thus, the esters are reheated to a temperature of 350°–400° F. and to the heated esters is added the desired amount of ethyl cellulose. Preferably the ethyl cellulose is added slowly with stirring and the stirring and heating continued until a homogeneous mixture results.

The polyhydroxy alcohol to be employed in the preparation of the mixed esters is preferably glycerol, pentaerythritol or dipentaerythritol and, of these, pentaerythritol appears to produce esters having the most satisfactory characteristics. Other polyhydroxy alcohols may be employed, however, to produce esters which are satisfactory as floor covering vehicles. These include erythritol, sorbitol, manitol and the like. It is to be noted that the polyhydroxy alcohols contain 3 or more hydroxyl groups per molecule and, further, that at least 2 of the hydroxyl groups are attached to primary carbon atoms. Pentaerythritol has 4 hydroxyl groups, each of which is attached to a primary carbon atom and it is believed that this accounts for the ability of this alcohol to produce the most desirable mixed esters. Although it has been indicated that sorbitol and manitol may be employed it is to be noted that in each of these compounds 4 of the hydroxyl groups are attached to secondary carbon atoms and it is believed that during the esterification side reactions take place, resulting in dehydroxylation, dehydration and the like, making these polyalcohols less desirable as esterifying agents. The dihydroxy compounds, i. e., the glycols, form liquid or fluid esters with the mixture of tall oil pitch and water-insoluble acids produced by wax oxidation, which are not capable of producing desirable floor coverings. Apparently the chain polymers produced by the dihydroxy alcohols are not as desirable as the cross-linked polymers obtained with trihydroxy alcohols.

The ethyl cellulose to be employed as a hardening agent for the mixed esters is preferably an ethyl cellulose having a medium viscosity, i. e., one having a viscosity of between about 10 and 100 centipoises at 100° C. in solution in a 70/30 toluene/alcohol solvent mixture in 5% concentration. Such ethyl cellulose materials which are generally made by the reaction of ethyl chloride upon alkali cellulose are available on the market. This material is an ether and will have an ethoxyl content of about 46% to 49%. In addition to ethyl cellulose which is preferred, other cellulose derivatives may be employed as hardening agents for the mixed esters.

In preparing floor coverings using the vehicles, i. e., the mixed esters described above, which may be the esters per se or may be the esters which have been hardened by the incorporation of about 5% to 20% of a hardening agent such as ethyl cellulose or other cellulose derivative, are heated and admixed with fillers, pigments and the like and subsequently applied to a backing material as described hereinbelow. Thus, the mixed ester or the hardened mixed ester is heated to its softening point or above to secure proper fluidity, such as to a temperature of about 200° F. to 400° F., and mixed with a mineral filler and/or pigment. Heating and mixing is continued until the filler and pigment are completely dispersed in the mass. The amount of filler to be employed will depend upon the type of filler employed and upon the type of service expected of the floor covering. Preferably between about 30% and 50% by weight, based on the total composition, of a mineral filler will be employed although smaller amounts such as 10% and larger amounts such as up to about 60% are found to give good results.

Fillers are preferably of the silicate type, as for example crushed feldspar, diatomaceous earth, silica dust, kaolin or the like. However, other mineral fillers may be employed. Such other materials include barytes, marble flour, whiting, titanium dioxide and the like. Some of these materials serve both as fillers and pigments.

The amount and type of pigment to be employed will depend upon the color desired in the finished floor covering. Pigments to be used are well known in the art and include iron oxide, ochres, antimony sulfide, titanium oxide and the like. The primary requirement of pigments for use in coloring the mastic floorings of this invention is that they must be stable up to about 400° F., i. e. the upper processing temperatures.

The filled and pigmented mixed ester is applied to a backing material generally by means of rolls, as is well known in the art. Backing materials which may be employed with the compositions described above include substantially all of the commercially used backings. Preferably a felt-type backing of a thickness ranging between .040 and .075 inches will be employed. In this case, the felt is first saturated by passing a sheet of the felt through a vat of heated asphalt at such a rate that good impregnation results. Desirably the felt will absorb 150% by weight of the asphalt. However, this percentage may vary between 100% and 200% depending upon the type of felt, the thickness of the felt sheet, the characteristics of the asphalt and the temperature of the asphalt at the time of application. The asphalt to be employed is preferably an airblown material having a melting point of about 160° F. and a penetration at 77° F. of about 30. This saturant, however, may have a melting point as low as 100–110° F. and as high as about 180° F. The melting point referred to is the A.S.T.M. test method D 36–26. The penetration is determined by A.S.T.M. test method D 5–25. These tests are described in A.S.T.M. Standards on Petroleum Products and Lubricants, pages 346 and 301 respectively, 1944. In preparing the saturated felt for treatment with the filled mixed ester resin the back of the felt may be coated with a waxy material to improve water resistance and decrease tackiness, thus preventing the finished floor covering from sticking back-to-front when rolled. The filled mixed esters are then applied directly to the face of the saturated felt.

The saturated felt backing is then coated with the filled mixed esters prepared as described above in the usual manner. Preferably the coating layer will be between 0.025 and 0.12 inches in thickness and is generally applied by means of heated rolls. For certain applications thicker coating layers may be employed up to as much as about 0.20 inches. The resulting floor covering is permitted to cool directly and cure at ordinary temperatures or it may be cured at a temperature such as about 110° F. to 250° F. In the case of ordinary temperature curing as much as 12 to 14 weeks will be required whereas shorter times such as 6 to 8 hours to as much as about one week, depending on the temperatures of storage, will be required to produce a satisfactorily cured flooring in the case of oven treatment.

A typical wax oxidate fraction suitable for use in preparing the mixed esters of this invention is prepared as follows:

About 8600 parts by weight of a refined petroleum wax, having a melting point between 145° F. and 155° F., were introduced into an oxidation vessel provided with heating and cooling coils. The wax was melted and the temperature increased to about 265° F., at a pressure of about 75 to 80 pounds per square inch gauge. Air was employed as the oxidizing agent and was passed through the oxidation vessel at a rate of 5.5 cubic feet per barrel per minute. At the end of about 24 hours the oxidation reaction had begun to progress satisfactorily and the temperature was lowered to 250° F. The course of the reaction is illustrated by reference to the following table showing the acid number of the wax being oxidized at various times during the reaction:

| Time, Hours | Acid No. |
| --- | --- |
| 12 | Neutral |
| 24 | 1.4 |
| 30 | 12.6 |
| 36 | 36.0 |
| 48 | 70.6 |
| 60 | 108.1 |
| 72 | 131.6 |
| 90 | 154.0 |
| 120 | 206.0 |
| 132 | 250.0 |

A portion of this oxidized wax having an acid number of 250 mg. KOH/g. was extracted three times with 10 volumes of hot water at 210° F. The water washed product was dehydrated by heating to 250° F. for a period of 4 hours. This water washed product had an acid number of 177, corresponding to an equivalent weight of 235, and a saponification number of 325 and is the material referred to in the following examples as "crude wax oxidate" or "water-insoluble wax oxidate."

A portion of the water-insoluble wax oxidate prepared above was slurried with above 10 volumes of light gasoline having a boiling range of 120°–185° F. in order to extract hydrocarbon-soluble material. The hydrocarbon-insoluble phase was separated and re-extracted with a second 10 volume portion of the light gasoline. The resulting hydrocarbon-insoluble phase was separated and heated to about 205° F. to evaporate the light gasoline. This product amounted to 54% based on the water washed oxidate and had an acid number of 194, corresponding to an equivalent weight of 187, and a saponification number of 375. This product will be referred to in the following examples as "hexane-insoluble acids" or "hexane-insoluble wax oxidate."

The tall oil pitch used in the following examples is a commercial product having an acid number of 75.5 mg. KOH/g. and thus having an equivalent weight of about 741.

Flexibility of the films produced by the mixed esters is determined using a conical mandrel. Test panels are prepared using tin plated steel panels having a thickness of 0.012 inches. The conical mandrel is 8 inches long and has a diameter at the base of 1.5 inches and of ⅛ inch at the apex. The specimen is clamped securely in position between the cone and a draw bar which guides the panel around the mandrel. The rate of bending is such that approximately fifteen seconds are required to make a 180 degree bend. The test panel is so arranged that the film is on the upper surface and is thus elongated as the bending occurs. The apparatus used in this test and the method of testing are described in "Physical and Chemical Examination, Paints, Varnishes, Lacquers and Colors," Gardner and Sward, 10th Edition, May 1946, pages 171 and 172.

The following examples will serve to illustrate further my invention but are not to be taken as in any way limiting the broader aspects of the invention.

*Example I*

A mixed ester mastic suitable for use in the preparation of mastic floor covering was prepared as follows:

A mixture of 750 g. of tall oil pitch, 250 g. of water washed crude wax oxidate having an acid number of 177 mg. KOH/g. and 87 g. of pentaerythritol was stirred and heated gradually to a temperature of 480° F.–490° F. After seven hours at this temperature the product had an acid number of 22.3 mg. KOH/g. Heating was continued for an additional hour and the product cooled. This material will be referred to as product A.

Product A was applied to a tin plated steel panel having a thickness of 0.012 inches in a film having an original thickness of 0.002 inches. One sample so prepared was maintained at a temperature of 180° F. to 190° F. for a period of 140 hours. The film was hard and dry at the end of this heating period. This film, although dry and hard, was not brittle and had good flexibility.

A 160 g. portion of the mixed ester, product A, produced as above was mixed with 20 g. of ethyl cellulose. The ester was heated separately to 350° F., at which time the ethyl cellulose was added with stirring and the temperature maintained between 350° F. and 400° F. until the ethyl cellulose was dispersed in the ester. This required approximately one hour. The resulting hardened ester, product B, was applied to tin plated steel panels as above described in a film thickness of 0.006 inches. Samples were cured for 64 hours at 180° F. to 190° F., at which time they were dry and hard. The films showed lack of brittleness and were of desirable flexibility.

Oil resistance of the baked films of both products A and B is good. Alkali resistance of the hardened esters, product B, after baking is particularly good. The alkali resistance is determined by applying 1% NaOH to the surface of the film for sixteen hours at room temperature. In this case the film was swollen somewhat, but a continuous film remained which was not dissolved or disintegrated by the alkali. Products A and B, when applied to an asphalt-saturated felt backing in thicknesses of about 0.005 inches, give coatings having characteristics similar to those applied to the tin-plated steel test strips referred to above.

*Example II*

A mastic suitable for use as a mastic flooring vehicle was prepared as follows:

A mixture of 750 g. of tall oil pitch, 250 g. of hexane-insoluble wax oxidate having an acid number of 194 mg. KOH/g. obtained from oxidized paraffin wax as described hereinabove and 97.5 g. of pentaerythritol was placed in a reaction vessel where it was stirred and heated gradually to a temperature of 480° F. The acid number of this mixture after heating for 7 hours was 18.5 mg. KOH/g. Heating was continued for an additional hour and the product then allowed to cool. This product, which will be referred to as product C, was applied to a tin plated steel test panel as described above in a film having an original thickness of 0.002 inch and the panel so prepared was maintained at a temperature of 180° F. to 190° F. for 140 hours. At the end of this curing period the film was hard and dry, but not brittle, and had good flexibility as indicated by the fact that no cracking occurred on bending the test panel at 180° around the conical mandrel described above.

A 160 g. portion of the mixed ester produced above (product C) was hardened with ethyl cellulose. The ester was heated to 350° F., at which time the ethyl cellulose was added with stirring and the temperature maintained between 350° F. and 400° F. until the ethyl cellulose was completely dispersed. Approximately one hour was required for complete fluxing. The resulting hardened ester, which will be referred to as product D, was applied to a steel test panel in a film thickness of 0.006 inch and the coated panel was cured for 64 hours at 180° F. to 190° F. The resulting film was dry and hard but was non-brittle and flexible. No cracking was observed in the flexibility test using a conical mandrel as described above.

A second test panel prepared and cured in the same manner using the hardened ester (product D) showed good resistance to both mineral and fatty oils and good resistance to alkali, as indicated by treatment with 1% NaOH for 16 hours at room temperature. The film was swollen but remained continuous and did not dissolve in the alkali. Asphalt-saturated felt coated with products C and D above, and oven cured at temperatures of about 200° F. for 150 hours, have desirable characteristics indicating the utility of these products in the preparation of floor coverings.

Example III

Product C of example II mixed with 50% of its weight of crushed feldspar at a temperature of 300° F. produces a flooring, when applied to an asphalt-saturated felt backing and cured, which is somewhat more resistant to abrasion than floor coverings prepared with product C without filler but otherwise having similar characteristics.

Example IV

Product D of Example II mixed with 40% of its weight of kaolin and 5% of its weight of iron oxide pigment produces a red-colored, hard, abrasion-resistant, flexible coating, when applied to an asphalt-saturated backing and cured according to the teachings of this invention.

Example V

Example II repeated using the equivalent amount of glycerol in place of pentaerythritol described produces floor covering materials having substantially the same characteristics as those obtained with pentaerythritol.

Example VI

For purposes of comparison with the products prepared in Examples I and II, an ester was prepared using tall oil pitch alone, i. e. without either hexane-insoluble wax oxidate or water-insoluble wax oxidate. In this instance 1000 g. of tall oil pitch and 49 g. of pentaerythritol was heated to a temperature of 490° F. for a period of 7 hours. During the heating period the acid number of the mixture decreased to 32 mg. KOH/g. Heating was continued for an additional hour and on cooling the product was observed to be slightly harder than the original pitch.

This ester was applied to tin plated steel test panels as described above and cured at a temperature of 180° F. to 190° F. The film thickness when applied was 0.002 inch. After 40 hours of curing the test panels were dry; however, the curing was continued for 140 hours. These test panels showed good resistance to oil but alkali resistance was poor and the film cracked over the entire length of the spindle in the flexibility test.

Samples of the above product, with and without added fillers, were far too brittle when applied to asphalt-saturated felt to serve as floor covering.

The foregoing description and examples of my invention are not to be taken as limiting since many variations may be made by those skilled in the art without departing from the spirit or the scope of the following claims:

I claim:

1. A composition of matter suitable for use as a floor covering comprising the reaction product obtained by esterifying a mixture of tall oil pitch and an acidic wax oxidation product with a polyhydroxy alcohol having at least 3 hydroxyl groups, said acidic wax oxidation product being prepared by blowing paraffin wax with a gas containing free oxygen until the acid number of the oxidized product is between 200 and 260 mg. KOH/g. and water washing the resulting acidic oxidation product.

2. A floor covering vehicle comprising a mixed ester obtained by esterifying tall oil pitch and a water-insoluble fraction of oxidized paraffin wax with a poly-functional alcohol having at least 3 hydroxyl groups, said water-insoluble fraction of oxidized paraffin wax being prepared by contacting paraffin wax at a temperature between about 210° F. and 285° F. in the liquid phase with a gas containing free oxygen until the acid number of the product is between about 200 and 260 mg. KOH/g. and water washing the resulting acidic oxidation product.

3. A composition of matter suitable for use as a floor covering comprising the reaction product obtained by esterifying a mixture of tall oil pitch and an acidic fraction of oxidized paraffin wax with a polyfunctional alcohol having at least 3 hydroxyl groups, said acidic fraction of oxidized paraffin wax being prepared by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g. and water washing the resulting oxidized wax.

4. A composition according to claim 3 in which the fraction of oxidized wax is a hydrocarbon-insoluble fraction of the water washed oxidized wax.

5. A composition according to claim 3 containing also between about 5% and about 20% based on the esterified product, of ethyl cellulose.

6. A composition according to claim 3 containing also between about 10% and about 60%, based on the total composition, of a mineral filler.

7. A composition according to claim 3 in which said polyfunctional alcohol has at least 2 hydroxyl groups attached to primary carbon atoms.

8. A composition according to claim 3 in which said polyfunctional alcohol is pentaerythritol.

9. A composition according to claim 3 in which said polyfunctional alcohol is glycerol.

10. A composition of matter suitable for use as a floor covering comprising a reaction product obtained by esterifying a mixture of tall oil pitch and a fraction of oxidized paraffin wax, said mixture containing between about 5% and about 75% by weight of said fraction of oxidized paraffin wax, with a chemically equivalent amount of a polyhydroxy alcohol having at least 3 hydroxyl groups at a temperature in the range of 300° F. to 600° F. until the acid number of the mixture is less than about 35 mg. KOH/g., said acidic fraction of oxidized paraffin wax being prepared by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g. and water washing the resulting oxidized wax.

11. A composition according to claim 10 in which said acidic fraction of oxidized wax is a hydrocarbon-insoluble fraction obtained by extracting the water-insoluble fraction with a low molecular weight hydrocarbon.

12. A composition suitable for use as a floor covering comprising the reaction product obtained by esterifying a mixture of tall oil pitch and a hydrocarbon-insoluble fraction of oxidized paraffin wax, said mixture containing between 5% and 75% by weight of said fraction of oxidized paraffin wax, with a chemically equivalent amount of a polyfunctional alcohol having at least 3 hydroxyl groups, and between 10% and 60%, based on the total composition, of a mineral filler; said hydrocarbon-insoluble fraction of oxidized paraffin wax being prepared by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g., water washing the resulting oxidized wax and extracting the resulting water-insoluble fraction with a low molecular weight hydrocarbon.

13. A composition of matter suitable for use as a floor covering comprising an ester to which is added between about 5% and 20% of ethyl cellulose, said ester being an ester of a mixture of tall oil pitch and a hydrocarbon-insoluble fraction of oxidized paraffin wax with a polyfunctional alcohol having at least 3 hydroxyl groups, said fraction of oxidized paraffin wax being prepared by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g., water washing the resulting oxidized wax and extracting the water-insoluble fraction of oxidized wax with a low molecular weight hydrocarbon.

14. A composition according to claim 13 containing between about 10% and 60% by weight, based on the total composition, of a mineral filler.

15. A method of preparing a mastic type floor covering composition which comprises esterifying a mixture of tall oil pitch and an acidic fraction of oxidized paraffin wax, said mixture containing between 5% and 75% of said acidic fraction, with a chemically equivalent amount of a polyfunctional alcohol having at least 3 hydroxyl groups at a temperature between about 300° F. and 600° F. until the acid number of the mixture is less than about 35 mg. KOH/g., said acidic fraction of oxidized paraffin wax being obtained by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g and water washing the resulting oxidized wax.

16. A method of preparing a mastic type floor covering composition which comprises heating a mixture of tall oil pitch and an acidic fraction of oxidized paraffin wax, said mixture containing between 5% and 75% of said acidic fraction, with a polyfunctional alcohol having at least 3 hydroxyl groups at a temperature between about 300° F. and 600° F. until the acid number of the mixture is less than about 35 mg. KOH/g., adding between about 5% and 20% by weight of ethyl cellulose and continuing the heating until a homogeneous mixture results, said acidic fraction of oxidized wax being prepared by oxidizing a paraffin wax having 15 to 50 carbon atoms per molecule in the liquid phase with a gas containing free oxygen at a temperature between about 210° F. and about 265° F. until the acid number of the oxidized wax is between about 200 and 260 mg. KOH/g. and water washing the resulting oxidized wax.

17. A method according to claim 16 in which between about 10% and about 60% by weight, based on the total composition, of a mineral filler is incorporated in the composition.

WILLIAM CASTELLANO.

REFERENCES CITED

The following references are of record in the file of this patent:

UNITED STATES PATENTS

| Number | Name | Date |
|---|---|---|
| 2,054,979 | Jahrstorfer et al. | Sept. 22, 1936 |
| 2,066,759 | Bent | Jan. 5, 1937 |
| 2,122,089 | Conrad | June 28, 1938 |
| 2,406,795 | Bernardi | Sept. 3, 1946 |
| 2,457,847 | Stubblebine | Jan. 4, 1949 |
| 2,495,305 | Wyler | Jan. 24, 1950 |

FOREIGN PATENTS

| Number | Country | Date |
|---|---|---|
| 563,547 | Germany | Nov. 7, 1932 |
| 108,270 | Sweden | Aug. 24, 1943 |